United States Patent
Leung

(12) 
(10) Patent No.: US 6,374,122 B1
(45) Date of Patent: *Apr. 16, 2002

(54) METHOD AND APPARATUS FOR SUPPORTING EXPANDED ELECTRONIC SERIAL NUMBER (EESN) FORMAT

(75) Inventor: Nikolai K. N. Leung, Arlington, VA (US)

(73) Assignee: QUALCOMM Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,340

(22) Filed: May 11, 1998

(51) Int. Cl.[7] .......................... H04B 07/204; H04Q 7/32
(52) U.S. Cl. .................. 455/551; 455/552; 455/419
(58) Field of Search ................................. 455/551, 552, 455/419; 379/189

(56) References Cited

U.S. PATENT DOCUMENTS

| 5,337,344 A | | 8/1994 | Alvesalo ........................ 379/58 |
|---|---|---|---|
| 5,454,027 A | * | 9/1995 | Kennedy, III et al. ...... 455/552 |
| 5,535,436 A | * | 7/1996 | Yoshida et al. ............. 455/551 |
| 5,561,853 A | * | 10/1996 | Pfundstein ................... 455/517 |
| 5,784,693 A | * | 7/1998 | Barber et al. ................ 455/434 |
| 5,797,101 A | * | 8/1998 | Osmani et al. ............. 455/551 |
| 5,848,360 A | * | 12/1998 | O'Connell et al. ......... 455/551 |
| 5,878,344 A | * | 3/1999 | Zicker ......................... 455/426 |
| 5,918,172 A | * | 6/1999 | Saunders et al. ........... 455/404 |
| 6,014,561 A | * | 1/2000 | Molne .......................... 455/419 |
| 6,029,065 A | * | 2/2000 | Shah ........................... 455/414 |

FOREIGN PATENT DOCUMENTS

WO          9317529          9/1993     ............ H04Q/7/04

* cited by examiner

Primary Examiner—Tod R. Swann
Assistant Examiner—Doug Meislahn
(74) Attorney, Agent, or Firm—Philip R. Wadsworth; Kent D. Baker; Bruce W. Greenhaus

(57) ABSTRACT

A 32 bit digital "amended electronic serial number" (AESN) is generated from a 56 bit "extended electronic serial number" (EESN). The AESN distinguishes each subscriber unit within a wireless system from each other subscriber unit. Two distinct methods are disclosed. In the first method, a manufacturers code field ("MFR") is tested to determine whether the subscriber unit has been assigned an EESN. If so, then the least significant 8 bits of the manufacturer's code field ("EMFR") are appended to the "serial number" field ("SN"). In the second method, each manufacturer generates serial numbers by applying a pseudo-random sequence. The "seed" for the pseudo-random sequence is based on the manufacturer's EMFR. This serial number is then combined with the 8 bit MFR.

8 Claims, 5 Drawing Sheets

U.S. 6,374,122 B1

METHOD AND APPARATUS FOR SUPPORTING EXPANDED ELECTRONIC SERIAL NUMBER (EESN) FORMAT

BACKGROUND OF THE INVENTION

I. Field of the Invention

The present invention relates to communications systems. More particularly, the present invention relates to a method and apparatus for identifying subscriber units in a wireless communication network.

II. Description of the Related Art

Wireless communications systems require the identity of subscribers (or subscriber units, such as wireless telephones, terminals, modems, etc.) to be determined for a number of purposes, including authentication for billing and to maintain secure communications over the connection between the subscriber unit and the party to which the subscriber is attempting to communicate. An electronic serial number (ESN) is a unique 32-bit serial number permanently stored in the subscriber unit equipment by the manufacturer. The ESN uniquely identifies a subscriber unit. The circuitry within the subscriber unit that provides the ESN is usually isolated from fraudulent contact or tampering. Many subscriber units are manufactured such that an attempt to alter the ESN renders the subscriber unit inoperative.

FIG. 1 illustrates the content of an ESN. The ESN 100 consists of a manufacturer's code field 102 and serial number field 104. The serial number field is twenty-four bits long and designates a serial number 104 uniquely assigned to a particular subscriber unit. The manufacturer's code field is eight bits in length and designates a manufacturer's code uniquely assigned to each manufacturer of subscriber units. The Federal Communications Commission (FCC) has mandated that each subscriber unit be assigned an ESN, so that radio transmissions can be identified, if need be. In combination with the ESN, a mobile identification number (MIN) uniquely identifies a subscriber. The unique combination of the ESN and the MIN is used to register and qualify a subscriber for service. In addition, this combination is used to enable all network functions pertaining to an individual subscriber.

The Telecommunications Industry Association (TIA) standard TIA/EIA IS-41, entitled Cellular Radio Telecommunications Intersystem Operations, provides a standard for intersystem operations among mobile switching centers (MSCs), home location registers (HLRs), visitor location registers (VLRs) for cellular networks to support subscriber mobility. In IS-41, a unique subscriber identification is provided by concatenating the MIN and the ESN. This combination is used primarily for registration and authentication functions.

In code division multiple access (CDMA) systems, as standardized by the TIA in TIA/EIA IS-95-A, entitled Subscriber unit-Base Station Compatibility Standard for Dual-Mode Wideband Spread Spectrum Cellular System, the electronic serial number is used to set the initial state of the scrambling pseudonoise (PN) generator. In IS-95-A, a 42-bit mask is generated in accordance with the 32-bit ESN. The first ten bits are a fixed sequence and the remaining 32 bits are a predetermined permutation of the subscriber unit ESN. The use of the ESN to provide a mask for the long code is described in U.S. Pat. No. 5,103,459, entitled "SYSTEM AND METHOD FOR GENERATING SIGNAL WAVEFORMS IN A CDMA CELLULAR TELEPHONE SYSTEM".

In addition, the ESN is used in authentication procedures as specified in TIA/EIA IS-41 (hereafter IS-41). Authentication is a set of functions used to prevent fraudulent access to cellular networks by phone illegally programmed with counterfeit mobile identification number (MIN) and electronic serial number (ESN) information. The functions require no subscriber intervention and provide a robust method of validating the true identity of a subscriber.

The authentication procedure specified in IS-41 is performed in accordance with the performance of a set of calculations, collectively known as the CAVE (cellular authentication and voice encryption) algorithm. The CAVE algorithm is described in U.S. Pat. No. 5,159,634, entitled "CRYPTOSYTEM FOR CELLULAR TELEPHONY". The authentication process and algorithm are based upon two secret numbers: the authentication key (A-key) and shared secret data (SSD). The A-key is a 64-bit secret number that is a permanently stored in the subscriber unit and securely stored in the authentication center. The A-key is never transmitted over the air, but is used in the generation of the SSD. The SSD is result of a calculation using the A-key, the ESN and a random number shared between the subscriber unit and the network. It is by matching the generated SSD of the network with the generated SSD of the subscriber unit that authentication is performed.

With the number of subscriber units increasing dramatically, there is a need for electronic serial numbers beyond the number provided for using the current numbering scheme. In response to this need, a 56 bit extended electronic serial number (EESN) has been proposed. FIG. 2 illustrates the organization and content of the proposed EESN. As shown in FIG. 2, the EESN 200 has an eight-bit manufacturer's code field 202 that indicates that an EESN is being used. The proposed method would require that a predetermined value be placed in the manufacturer's code field of the EESN 200. One proposal is to have this predetermined value be equal to 128 decimal. The EESN also has a twenty-four-bit serial number field 204 that designates the serial number assigned to the subscriber unit. An eight-bit reserved field 206 provides additional capacity for expanding the current fields or adding an additional field at a later time. A sixteen-bit extended manufacturer's field 208 designates the manufacturer's code in the EESN. It can be seen that there are an additional eight bits provided in the EESN to designate the manufacturer's code.

However, as described above, many existing operations require a 32 bit ESN. Thus, there is a need felt in the art for a method by which a 56 bit EESN can be used in the authentication, registration and scrambling operations that are to be performed using a 32 bit ESN.

Therefore, there is a need for a method and apparatus that can make wireless infrastructure that is designed to accommodate 32-bit ESNs compatible with newer subscriber units that are assigned a 56-bit EESN.

SUMMARY OF THE INVENTION

The method and apparatus disclosed herein generates a 32 bit digital "amended electronic serial number" (AESN) from a 56 bit "extended electronic serial number" (EESN). The AESN distinguishes each subscriber unit within a wireless system from each other subscriber unit. Two distinct methods are disclosed. In accordance with the both the first and second method, an AESN is only generated when an EESN has been assigned to the subscriber unit by the manufacturer.

In accordance with the first method, a portion of the EESN referred to as the manufacturers code field ("MFR") is tested to determine whether the subscriber unit has, in fact, been assigned an EESN. If the MFR value (i.e., the value designated in the MFR field) is equal to 128 decimal ("1000 0000" binary), then an EESN is being used. If so, then the least significant 8 bits of a portion of the EESN, referred to commonly as the extended manufacturer's code field ("EMFR") is appended to the 24 bits of the EESN that are commonly referred to as the "serial number" field ("SN"). Accordingly, the AESN would comprise the 8 least significant bits of the EMFR and the 24 bits of the SN.

In accordance with the second method, each manufacturer would be required to generate, by applying a pseudo-random sequence, the 24 bit serial numbers which must be assigned to subscriber units that are produced by that manufacturer. The "seed" for the pseudo-random sequence is based on the manufacturer's EMFR, and therefore different for each manufacturer. This serial number is then combined with the 8 bit MFR to generate an AESN whether the manufacturer has assigned an EESN or an ESN. That is, the 8 bits of the MFR taken together with the 24 bits of the serial number to comprise an AESN whether the manufacturer has assigned an EESN or an ESN.

The first method has the lowest probability that two subscriber units operating within the same region or metropolitan trading area will be assigned the same 32 bit value. However, the second method is simpler and is requires less adaptation by existing equipment within the wireless infrastructure.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
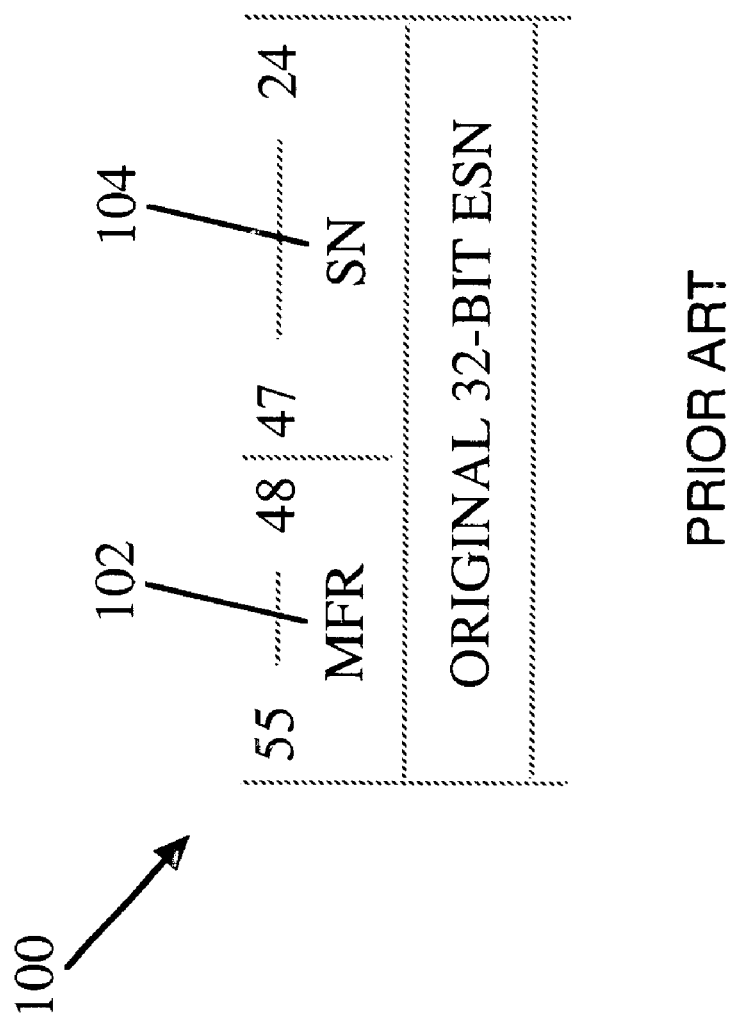
FIG. 1 illustrates the content of an ESN.
Figure 2:
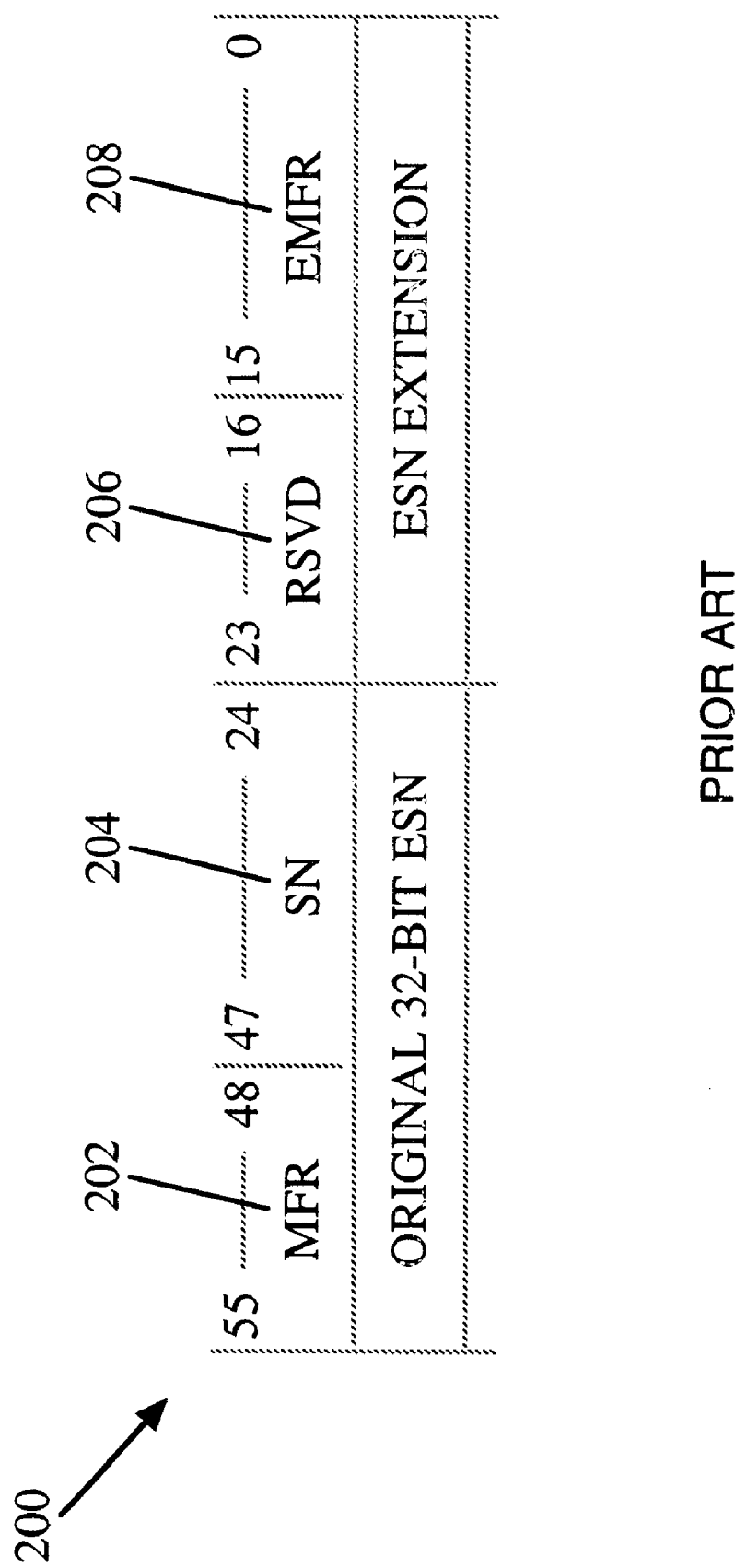
FIG. 2 illustrates the format of an EESN.

The following is a detailed description of a method and apparatus that includes embodiments of the present invention. The disclosed method and apparatus allows algorithms that currently require a 32-bit electronic serial number ("ESN") to be input, to operate with subscriber units that have no such 32-bit ESN assigned. That is, algorithms, such as those algorithms described in the TIA/EIA Interim Standard IS-95-A entitled "Subscriber unit-Base Station Compatibility Standard for Dual-Mode Wideband Spread Spectrum Cellular System", which is incorporated herein by reference require a subscriber unit to be identified by a 32-bit ESN. Subscriber units currently read the ESN from a memory within the subscriber unit. This ESN is then used by the particular algorithm to ensure secure communications between the base station and the subscriber unit, to authenticate the subscriber for billing purposes, and to otherwise control access to, and security of, the wireless communication system. However, some subscriber units have not been assigned an ESN, but rather have been assigned a unique 56-bit extended electronic serial number ("EESN").

Today, each subscriber unit is permanently and uniquely assigned either a 32-bit ESN, or for more recently manufactured subscriber units, EESN. The recent expansion of the 32-bit ESN to a 56-bit EESN has a significant impact on the way algorithms that require the 32-bit ESN operate. That is, these algorithms are designed to accept a 32-bit input. They are not capable of handling a 56-bit input.

Two methods are presently disclosed for generating a 32-bit amended ESN ("AESN") from the 56-bit EESN. This 32-bit AESN is then provided to algorithms that require a 32-bit ESN.

The first method produces an AESN as follows. The value to be examined is initially read from a memory within the subscriber unit. An determination is made as to whether the subscriber unit has been assigned an ESN or an EESN. If an EESN is present, an AESN will replace the existing ESN as input to all ESN-related algorithms. This AESN is optimal, in that it minimizes the probability of having the same 32-bit code value associated with more than one mobile.

The second method uses the original ESN field of the EESN format. Though more backward compatible, this function has a higher probability that more than one mobile will provide the same 32-bit code value to the infrastructure, especially when manufacturers are in the early stages of deployment. The invention describes a method to significantly reduce this probability.

The average probability that more than one subscriber unit within the same sector will be assigned the same 32-bit AESN is $P_d(x)$:

$$P_d(x) = 1 - \frac{n!}{(n-x)!n^x} >= 1 - \frac{2^{32}!}{(2^{32}-x)!2^{32x}}$$

where x is the number of mobiles in the sector that have been assigned EESNs; y is a 56-bit EESN; f(y) is a 32-bit function of the 56 bit EESN; $n=2^{H[f(y)]}$ and H[f(y)] is the Shannon entropy of f(y) over the probability space of y.

$P_d(x)$ is minimized if and only if f(y) has a maximum entropy of 32 bits. The bound is based on the inequality, H[f(y)]<=32. For example, for any 32-bit f(y) in a sector, $P_d()$ is bounded by, $P_d(20$ mobiles$)>=4.42$ E-8

$P_d(30$ mobiles$)>=1.01$ E-7

Although using the original 32-bit ESN field of the EESN is simple, it has two problems. First, H[f(y)] is reduced to ~24 bits (the entropy from old ESN mobiles becomes negligible as more EESN mobiles are deployed). Thus, $P_d(20)>=1.13$E-5

$P_d(30)>=2.59$E-5

Second, and more significantly, because mobile manufacturers tend to assign their serial numbers (i.e., the 24-bit "SN" portion of the either the ESN or EESN) sequentially, there is a good chance that their early EESN mobiles will have the same 32-bit ESN's.

The probability of non-distinct ESN's during early deployment can be estimated as follows. Assuming that each manufacturer's mobiles are uniformly distributed throughout all the sectors, then for a single sector with a set of x EESN mobiles, $$P_d(x) = 1 - \prod_{i=2}^{M} \frac{(L_i - S_{i-1})!}{(L_i - S_i)! L_i^{R_i}}$$

$$\text{where, } R_i = x \frac{L_i}{\sum_{j=1}^{M} L_j} \text{ and } S_i = \sum_{k=1}^{i} R_k$$

and where M manufacturers deliver mobiles into an metropolitan trade area ("MTA"); and $L_i$, for i=1 ... M, represents the number of mobiles released by each manufacturer, i.e., manufacturer i has released SN's 0 through $L_i-1$ and $L_i$'s is indexed such that $L_{j+1} >= L_j$ for j=1 ... (M-1). It should be noted that Π represents a product of factors indexed by the limits shown above and below the symbol.

In one example, suppose M=2, and $L_1=L_2=L$,

| L = # mobiles | $P_d(20)$ | $P_d(30)$ |
|---|---|---|
| 10,000 | 1.44E-2 | 3.25E-2 |
| 100,000 | 1.40E-3 | 3.30E-3 |
| 1,000,000 | 1.45E-4 | 3.30E-4 |

Figure 3:
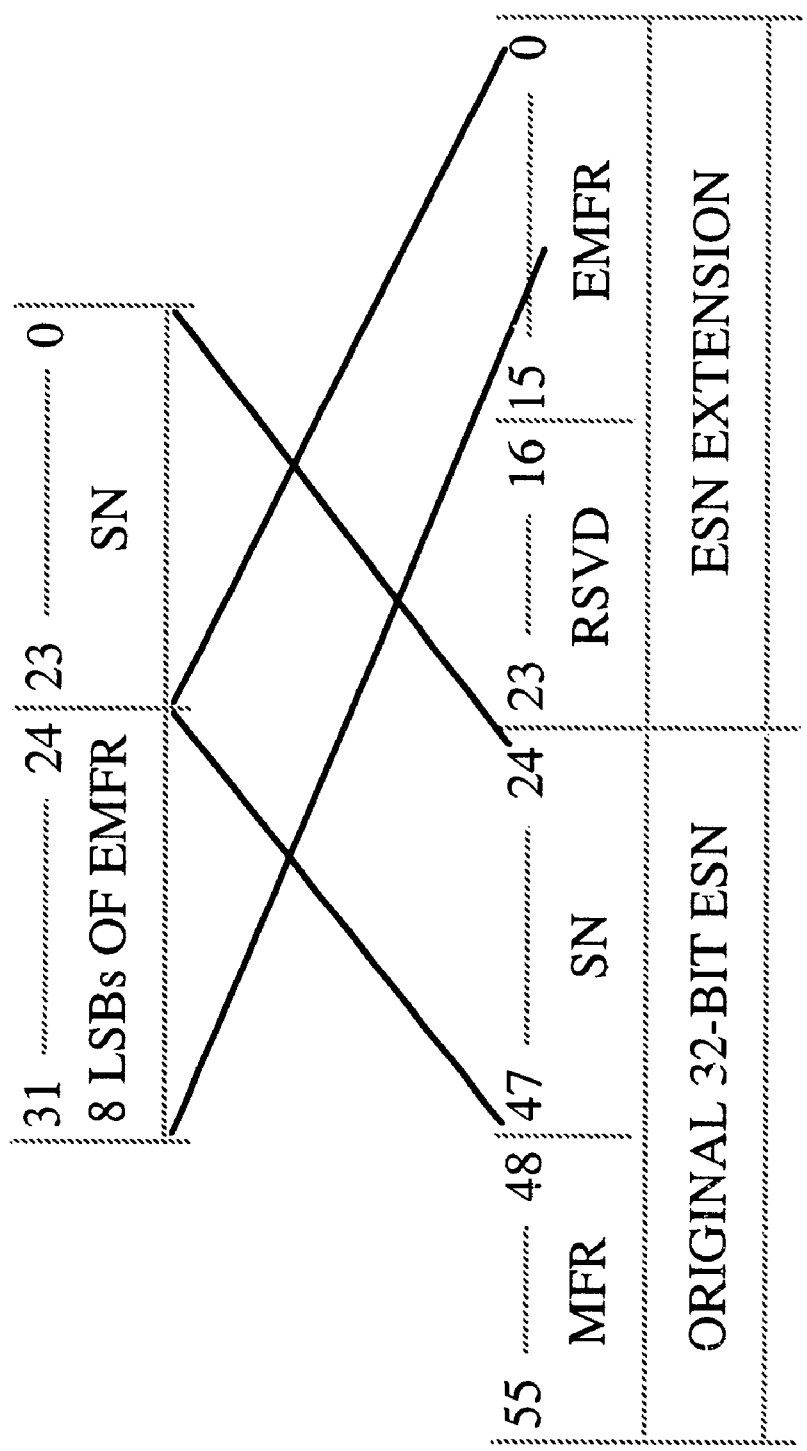
FIG. 3 illustrates the content of the AESN in accordance with a first method disclosed herein.

In accordance with the first method disclosed herein for generating an AESN, the AESN is generated by concatenating the least significant 8 bits of the EMFR with each of the bits of the SN. FIG. 3 illustrates the content of the AESN in accordance with this first method. Therefore:

f(EESN)=Least Significant 8 bits of EMFR+SN=AESN

Initially, the value in question is read from a memory in the subscriber unit. A predetermined portion, which in the present example is the MFR, is tested to see if a predetermined value is present. In one example, when the MFR=128, any ESN function in either the base or subscriber unit shall use the least significant 8 bits of EMFR instead of MFR, along with the SN for any purpose for which the ESN would have been used. Assigning EMFR's sequentially will greatly reduce the chance that two manufacturers with the same EMFR least significant bits will deploy in the same time frame. Generating the AESN in this manner, essentially minimizes $P_d(x)$ in any period of time to:

$P_d$(20 mobiles)~=4.42 E-8

$P_d$(30 mobiles)~=1.01 E-7

It should be apparent to those skilled in the art that these are several trivial permutations to the AESN and the disclosed method for generating an AESN as described above, each of which is deemed to be within the scope of the present invention.

Figure 4:
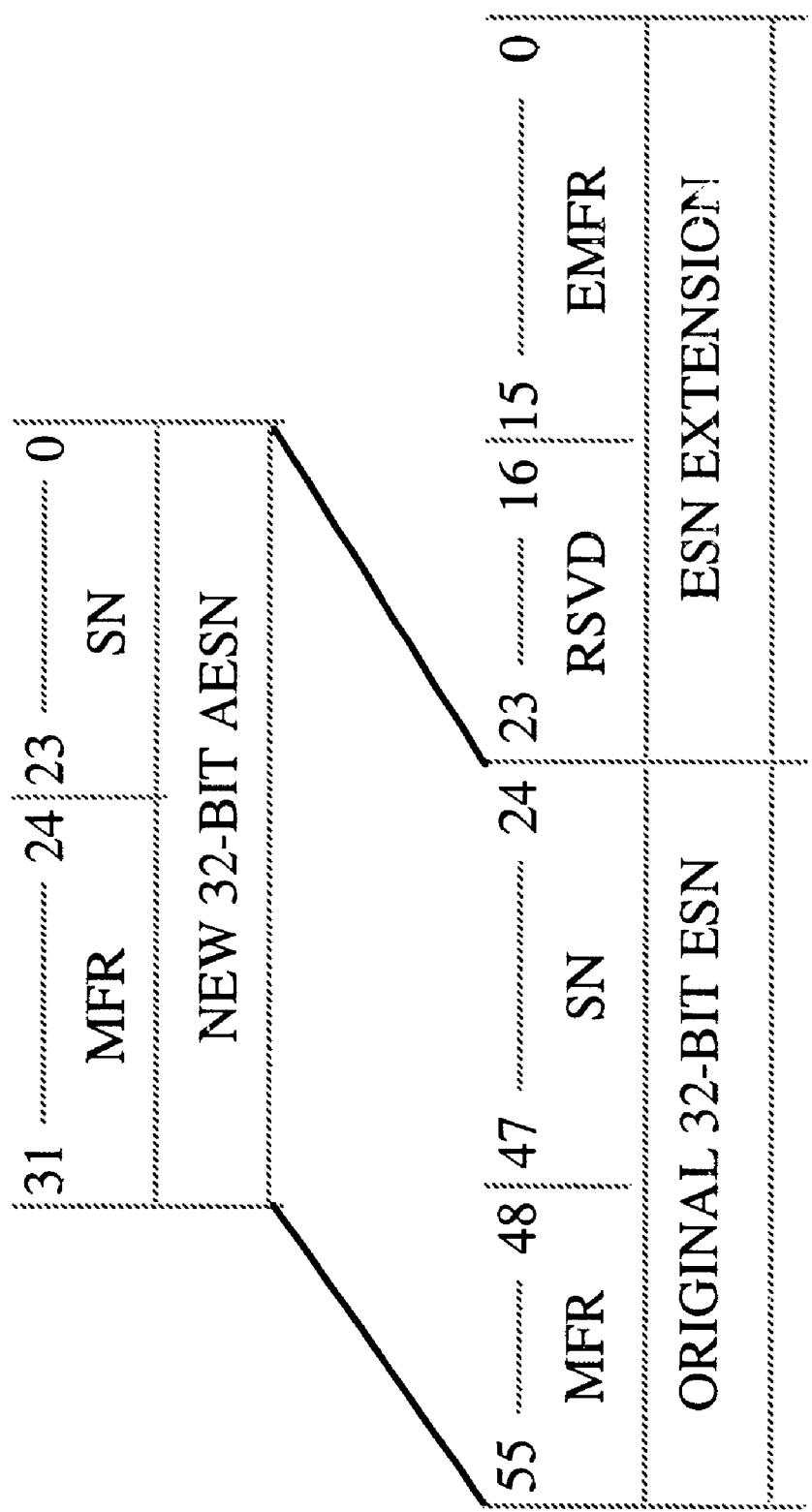
FIG. 4 illustrates the content of the AESN in accordance with a second method for generating an AESN disclosed herein.

In accordance with the second method for generating a 32-bit AESN from the 56-bit EESN, the original 32-bit ESN (which is included as bits 24–55 of the EESN) constitutes the AESN. FIG. 4 illustrates this second method for generating an AESN. Accordingly, this method makes the AESN more backward compatible with the existing ESN functions. Furthermore, all subscriber units can use the same 32-bits whether the mobile has an ESN or EESN.

However, it should be noted that the MFR of a subscriber unit that has been assigned an EESN will be 128 decimal (indicating that an EESN has been assigned). In addition, as mentioned above, the serial numbers are commonly assigned sequentially. Therefore, to prevent mobiles which were manufactured and deployed by different manufacturers from having duplicate ESN's, each manufacturer must assign the serial numbers of new subscriber units in order according to a pseudo-random sequence. Therefore, each subscriber unit made by the same manufacturer is assigned the next number from a pseudo-random sequence. The seed for this pseudo-random sequence is preferably based on the manufacturers EMFR, and therefore be different for each manufacturer.

An example of such a sequence follows.

$$SN(i) = \{EMFR * 2^{(24-m)} + i\} \text{modulo } 2^{24}$$

$$= \{[m \text{ LS-bits of } (EMFR)] * 2^{(24-m)} + i\} \text{modulo } 2^{24}$$

where SN(i) is the $i^{th}$ serial number being assigned by that manufacturer; and [m LS-bits of (EMFR)] is the m least significant bits of the manufacturer's EMFR. The variable m preferably varies from 0 to 16, allowing the designer to control the spacing between SN's generated by manufacturer's with consecutive EMFR's. The larger the value of m, the less likely mobiles from these manufacturers will have the same SN's. On the other hand, m should not be made too large. Due to the finite 24-bit SN space and the circular nature of the modulo function, manufacturer's with EMFR's spaced by $2^m$ will have overlapping SN's. The designer can optimize the choice of m based on deployment patterns of mobile manufacturers and EMFR assignment patterns. (In a preferred embodiment, m=5).

There are other possible sequencing functions for generating SN(i)'s that could be used and which would be considered within the scope of the present invention used in the method and apparatus disclosed herein.

Figure 5:
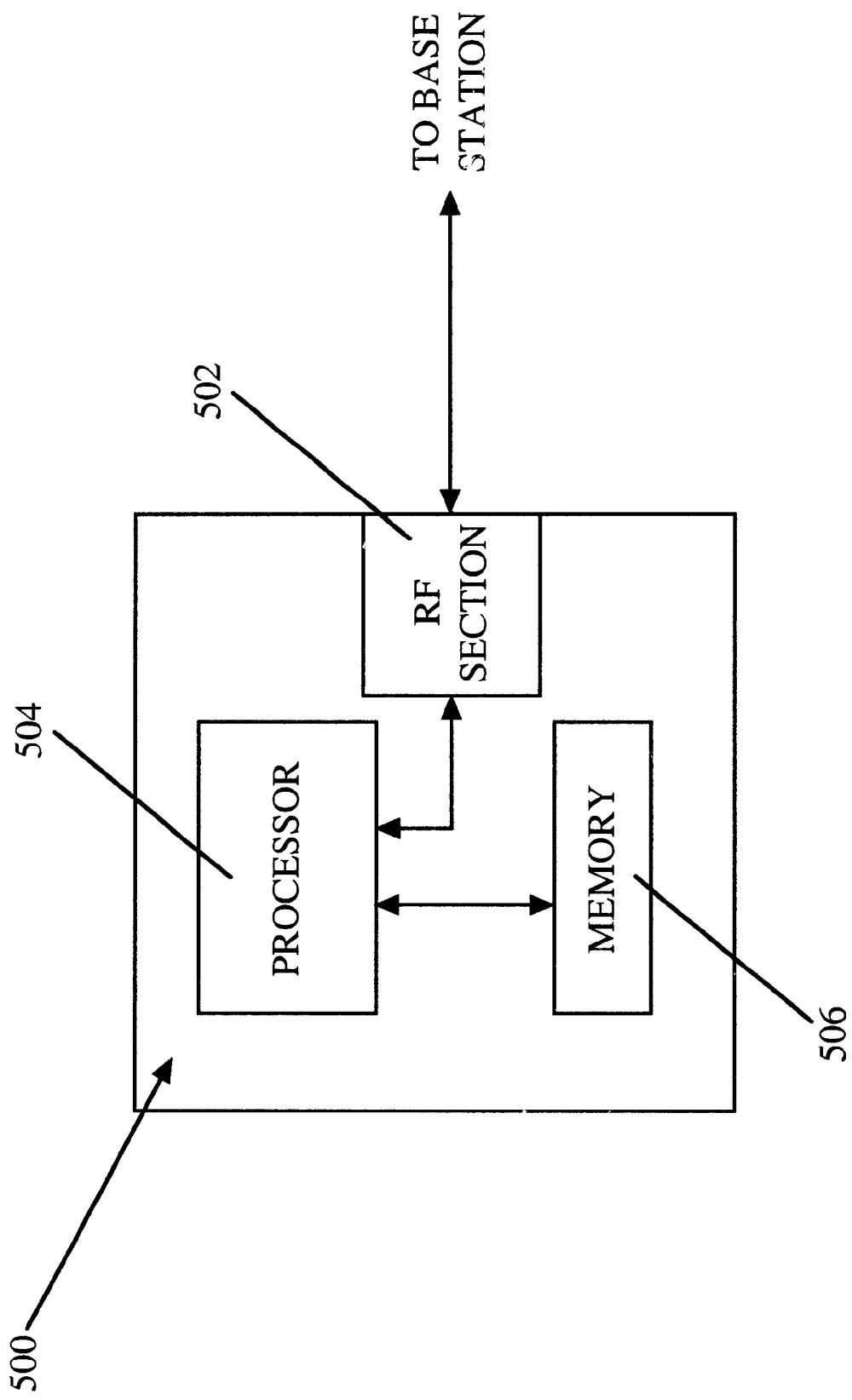
FIG. 5 is a simplified block diagram of a subscriber unit in accordance with the method and apparatus disclosed herein.

FIG. 5 is a simplified block diagram of a subscriber unit 500 in accordance with the method and apparatus disclosed herein. The subscriber unit 500 has a radio frequency ("RF") section 502. The RF section 502 modulates the signals to be transmitted with an appropriate RF carrier and transmits the modulated signals to a receiver, such as a base station within a wireless communication system. In addition, the RF section 502 receives and demodulates signals intended for the subscriber unit 500. A programmable device 504, such as a microprocessor, computer, digital signal processor or other such programmable device, is coupled to the RF section 502. The programmable device 504 is also coupled to a memory device 506. The memory device 506 may be any device capable of storing information, such as a dynamic random access memory (DRAM), an read only memory (ROM), a magnetic disk drive, or an optical memory device, such as an optical disk drive.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for generating an amended electronic serial number (AESN) from an extended electronic serial number (EESN), the EESN having a first field for designating a manufacturer's code, a second field designating a serial number associated with a particular subscriber unit, a third field designating an extended manufacturer's code, the method including the steps of:

(a) reading a value of a predetermined length from a memory;

(b) determining whether a predetermined portion of the value read from the memory contains a predetermined value; and (c) if the value read from the memory contains the predetermined value, then identifying the value read from memory as an EESN and generating an AESN from the read value using at least a portion of the content of the third field and at least a portion of the content of the second field.

2. The method of claim 1, wherein the at least a portion of the content of the third field is concatenated with the at least a portion of the content of the second field.

3. The method of claim 1, wherein the at least a portion of the content of the third field is the eight least significant bits.

4. The method of claim 3, wherein the at least a portion of the content of the second field is the entire second field.

5. An apparatus for generating an amended electronic serial number (AESN) from an extended electronic serial number (EESN), the EESN having a first field for designating a manufacturer's code, a second field designating a serial number associated with a particular subscriber unit, a third field designating an extended manufacturer's code, the apparatus comprising:

a processor coupled to a memory, wherein the processor performs the steps of:

(a) reading a value of a predetermined length from the memory;

(b) determining whether a predetermined portion of the value read from the memory contains a predetermined value; and (c) if the value read from the memory contains the predetermined value, then identifying the value read from memory as a EESN and generating an AESN from the read value using at least a portion of the content of the third field and at least a portion of the content of the second field.

6. The processor of claim 5, wherein the at least a portion of the content of the third field is concatenated with the at least a portion of the content of the second field.

7. The processor of claim 5, wherein the at least a portion of the content of the third field is the eight least significant bits.

8. The processor of claim 7, wherein the at least a portion of the content of the second field is the entire second field.

* * * * *